(12) United States Patent
Mei et al.

(10) Patent No.: US 8,398,441 B2
(45) Date of Patent: *Mar. 19, 2013

(54) ASSEMBLY AND SYSTEM OF DATACOMMUNICATION CABLES AND CONNECTORS

(75) Inventors: Richard Y. Mei, Parker, TX (US);
Daniel W. Macauley, Fishers, IN (US);
Michael German, Secaucus, NJ (US)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/312,095

(22) Filed: Dec. 6, 2011

(65) Prior Publication Data
US 2012/0077388 A1 Mar. 29, 2012

Related U.S. Application Data

(63) Continuation of application No. 12/763,410, filed on Apr. 20, 2010, now Pat. No. 8,075,348.

(60) Provisional application No. 61/171,899, filed on Apr. 23, 2009, provisional application No. 61/241,456, filed on Sep. 11, 2009.

(51) Int. Cl.
*H01R 24/00* (2011.01)

(52) U.S. Cl. ...................................... 439/676

(58) Field of Classification Search .................... 439/49, 439/55, 502, 607.25, 638, 95, 676
See application file for complete search history.

(56) References Cited

U.S. PATENT DOCUMENTS

| | | | |
|---|---|---|---|
| 4,767,338 A | 8/1988 | Dennis et al. | |
| 5,340,333 A | 8/1994 | Schroth | |
| 5,690,511 A | 11/1997 | Melito | |
| 5,944,535 A | 8/1999 | Bullivant et al. | |
| 6,086,415 A * | 7/2000 | Sanchez et al. | 439/540.1 |
| 6,537,106 B1 | 3/2003 | Follingstad | |
| 7,404,736 B2 * | 7/2008 | Herbst et al. | 439/557 |
| 8,075,348 B2 * | 12/2011 | Mei et al. | 439/676 |
| 2007/0270044 A1 | 11/2007 | Belopolsky et al. | |
| 2008/0132113 A1 | 6/2008 | Male et al. | |

FOREIGN PATENT DOCUMENTS

| | | |
|---|---|---|
| EP | 1 727 020 A2 | 11/2006 |
| EP | 2 034 565 A2 | 3/2009 |

OTHER PUBLICATIONS

The International Search Report and The Written Opinion for PCT/US2010/031830, dated Jul. 30, 2010.
Written Opinion of the International Preliminary Examining Authority for PCT/US2010/031830, mailed on Jun. 1, 2011.
Examination Report from EPO for EP Application No. 10715634.1-1231 mailed on Jul. 31, 2012.

* cited by examiner

*Primary Examiner* — Edwin A. Leon
(74) *Attorney, Agent, or Firm* — Muncy, Geissler, Olds & Lowe, PLLC

(57) ABSTRACT

A datacommunication interconnection system includes (a) an extension trunk cable-connector assembly and (b) a trunk cable-connector assembly. The extension trunk cable-connector assembly comprises: a first cable including a plurality of first subunits, each of the first subunits comprising a plurality of twisted pairs of conductors; a jack attached to one end of the cable; and a plug attached to an opposite end of the cable. Each of the jack and the plug includes a contact for each of the conductors of the cable. The trunk cable-connector assembly comprises: a second cable including a plurality of second subunits, each of the second subunits comprising a plurality of twisted pairs of conductors; a plug attached to one end of the second cable and connected with the jack of the extension trunk cable; and a plurality of RJ-45 connectors attached to subunits at an opposite end of the second cable.

13 Claims, 18 Drawing Sheets

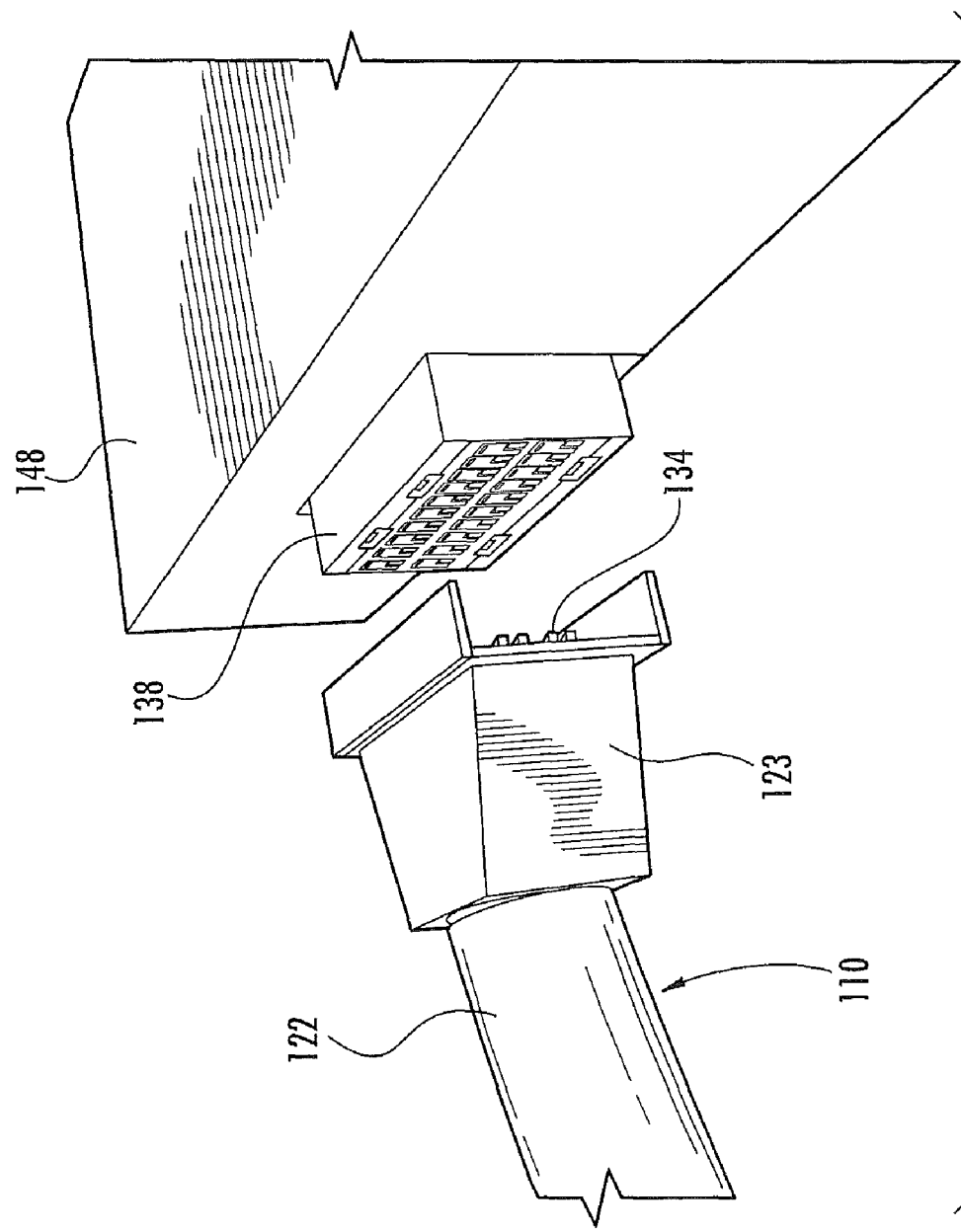

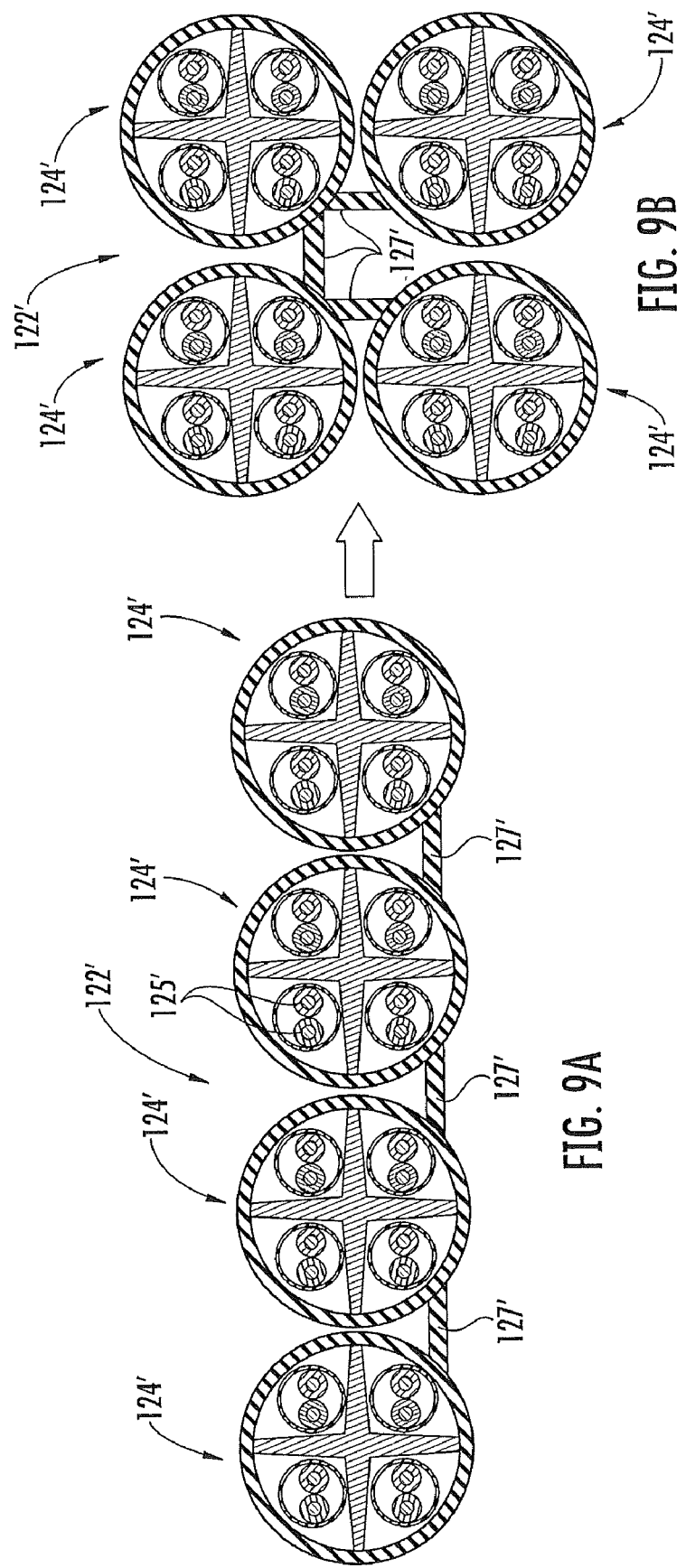

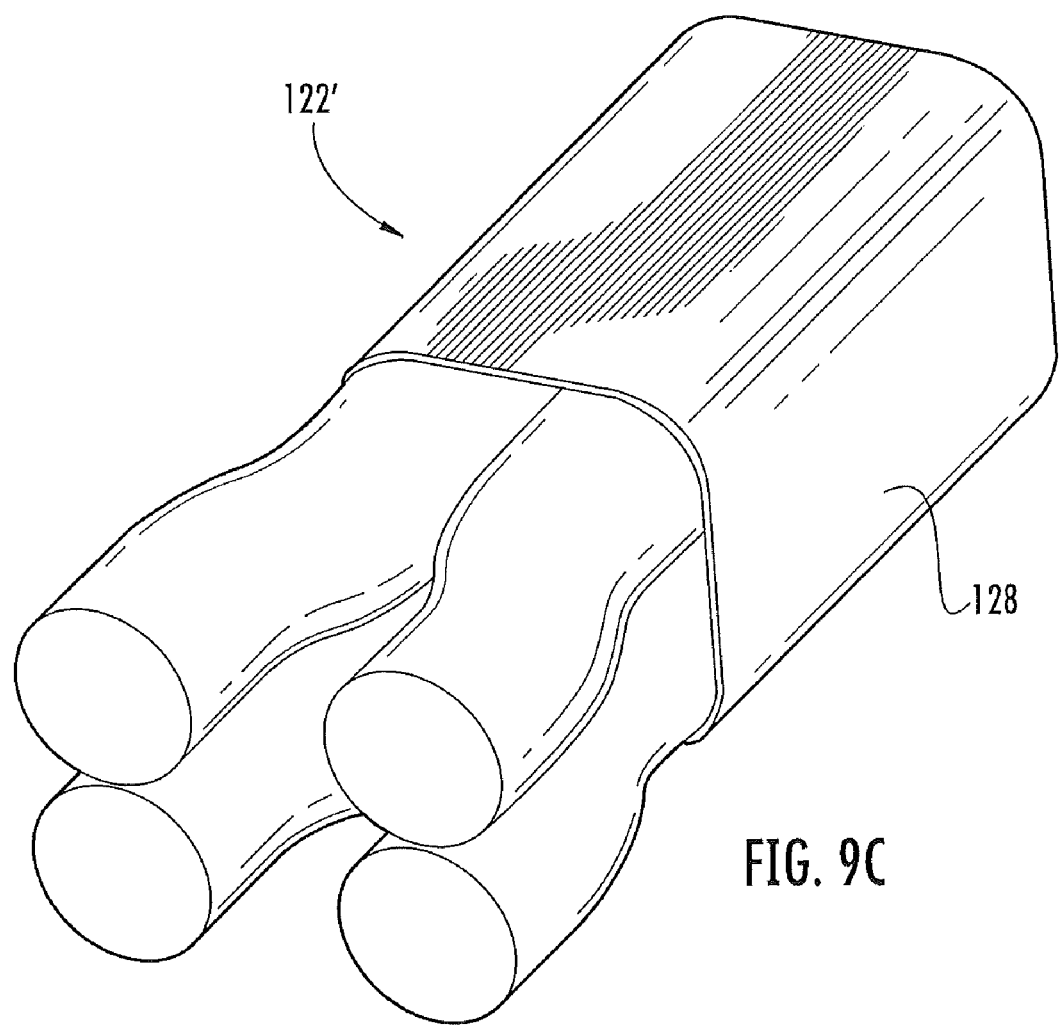

ASSEMBLY AND SYSTEM OF DATACOMMUNICATION CABLES AND CONNECTORS

RELATED APPLICATIONS

This application is a continuation claiming priority from U.S. patent application Ser. No. 12/763,410, filed Apr. 20, 2010 now U.S. Pat. No. 8,075,348 which claims priority from U.S. Provisional Patent Application No. 61/171,899, filed Apr. 23, 2009, and from U.S. Provisional Patent Application No. 61/241,456, filed Sep. 11, 2009, the disclosure of each of which are hereby incorporated herein in their entirety.

FIELD OF THE INVENTION

The present invention relates generally to datacommunication components, and more particularly to datacommunication cables and connectors.

BACKGROUND

A network patching system is typically used to interconnect the various communication lines within a closet, computer room or data center. In a conventional network patching system, the communication lines are terminated within a closet or cabinet in an organized manner via one or more patch panels mounted on a rack or frame. Multiple ports are included in the patch panel, typically in some type of organized array. Each of the different ports is connected with a communications line. In small patching systems, all communications lines may terminate on the patch panels of the same rack or cabinet. In larger patching systems, multiple racks or cabinets may be used, wherein different communications lines terminate on different racks or cabinets. Interconnections between the various communications lines are made by connecting patch cords to the ports. By selectively connecting the various communications lines with patch cords, any combination of communications lines can be interconnected.

A patch panel typically includes connectors (such as RJ-45 jacks) on its front surface that receive mating connectors (such as RJ-45 plugs) for interconnection with other equipment. In most patch panels, a cable with a plurality of individual conductors is routed to the rear of the patch panel. The connection between the cable and the connectors of the patch panel is typically made through punch-down connectors or insulation displacement contacts (IDCs). Making these connections can be rather time-consuming, as can making changes to the connections subsequently. Moreover, as performance requirements become more stringent, it may be difficult for some types of connections to meet higher (e.g., Category 6A) performance requirements.

In view of the foregoing, it may be desirable to provide other configurations for patch panels and the like that simplifies interconnections and/or enhances performance.

SUMMARY

As a first aspect, embodiments of the present invention are directed to a cable-connector assembly. The assembly comprises: a trunk cable comprising a plurality of subunits, each of the subunits comprising a plurality of twisted pairs of conductors and a shield circumferentially surrounding the plurality of twisted pairs; and a connector attached to each end of the cable, each of the connectors including a contact for each of the conductors of the cable. Such an assembly can be utilized to quickly and easily connect datacommunication components, even those that require enhanced (e.g., Category 6A) performance.

As a second aspect, embodiments of the present invention are directed to an extension trunk cable-connector assembly. This assembly comprises: a cable including a plurality of subunits, each of the subunits comprising a plurality of twisted pairs of conductors; a jack attached to one end of the cable; and a plug attached to an opposite end of the cable. Each of the jack and the plug includes a contact for each of the conductors of the cable. Such an extension trunk cable can be used to span other cabling used to interconnect enhanced performance datacommunication components.

As a third aspect, embodiments of the present invention are directed to a datacommunication interconnection system comprising (a) an extension trunk cable-connector assembly and (b) a trunk cable-connector assembly. The extension trunk cable-connector assembly comprises: a first cable including a plurality of first subunits, each of the first subunits comprising a plurality of twisted pairs of conductors; a jack attached to one end of the cable; and a plug attached to an opposite end of the cable. Each of the jack and the plug includes a contact for each of the conductors of the cable. The trunk cable-connector assembly comprises: a second cable including a plurality of second subunits, each of the second subunits comprising a plurality of twisted pairs of conductors; a plug attached to one end of the second cable and connected with the jack of the extension trunk cable; and a plurality of RJ-45 connectors attached to respective ones of the second subunits at an opposite end of the second cable.

As a fourth aspect, embodiments of the present invention are directed to a datacommunication connector unit, comprising: a housing; a printed wiring board mounted within the housing; a plurality of RJ-45 jacks mounted on the printed wiring board and accessible from one side of the housing; and a backplane connector mounted to the printed wiring board and electrically connected to the RJ-45 jacks, the backplane connector being accessible from a second side of the housing.

BRIEF DESCRIPTION OF THE FIGURES

FIG. 7 is an exploded perspective view of a cable-connector assembly according to additional embodiments of the present invention.

FIG. 9A is a section view of a twisted pair cable according to embodiments of the present invention, wherein the subunits of the cable are unfolded relative to each other.

FIG. 9B is a section view of the twisted pair cable of FIG. 9A, wherein the subunits are in a folded condition.

FIG. 9C is a perspective section view of the twisted pair cable of FIG. 9B showing the subunits in a folded condition and covered by a jacket.

DETAILED DESCRIPTION

Figure 1:
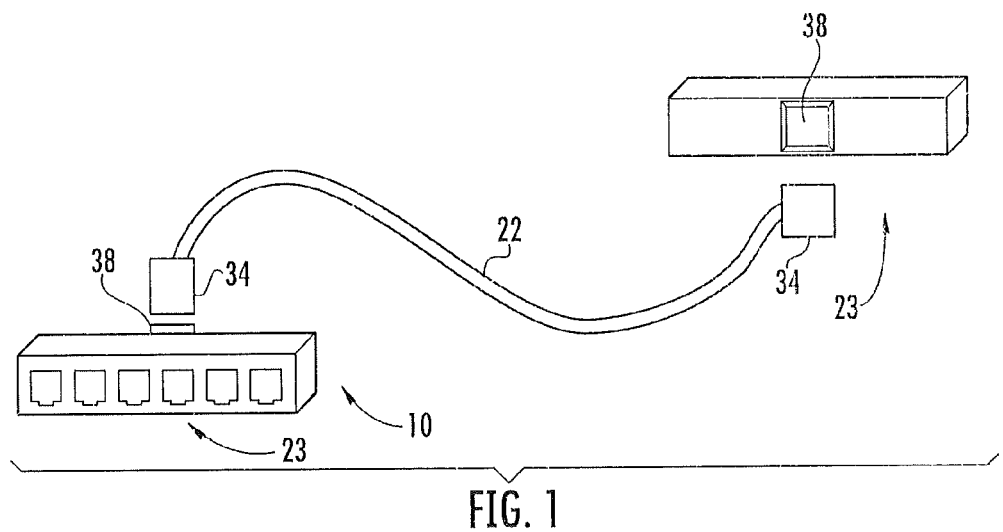
FIG. 1 is a schematic perspective view of a cable-connector assembly according to embodiments of the present invention.

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" or "above" the other elements or features. Thus, the exemplary term "under" can encompass both an orientation of over and under. The device may be otherwise oriented (rotated 90 degrees or at other orientations) and the spatially relative descriptors used herein interpreted accordingly. As used herein, "vertical" has the conventional meaning, i.e., upright; or at a right angle to the horizon.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Where used, the terms "attached", "connected", "interconnected", "contacting", "mounted" and the like can mean either direct or indirect attachment or contact between elements, unless stated otherwise.

Also, as used herein the term "connector" is intended to encompass telecommunications connectors and devices employed to facilitate the interconnection of telecommunications cords and cables for the transmission of signals therebetween. A connector may include a termination device at the end of a cord or cable, an adapter that facilitates the interconnection of two termination devices, a jack, plug, or the like typically employed with copper cables and cords, or other devices that provide a location or site for the interconnection of cables and cords.

Referring now to the drawings, a cable-connector assembly, designated broadly at 10, is shown in FIG. 1. The assembly 10 includes a cable 22 and a connector unit 23 at each end thereof. These components are discussed in greater detail below.

Figure 3:
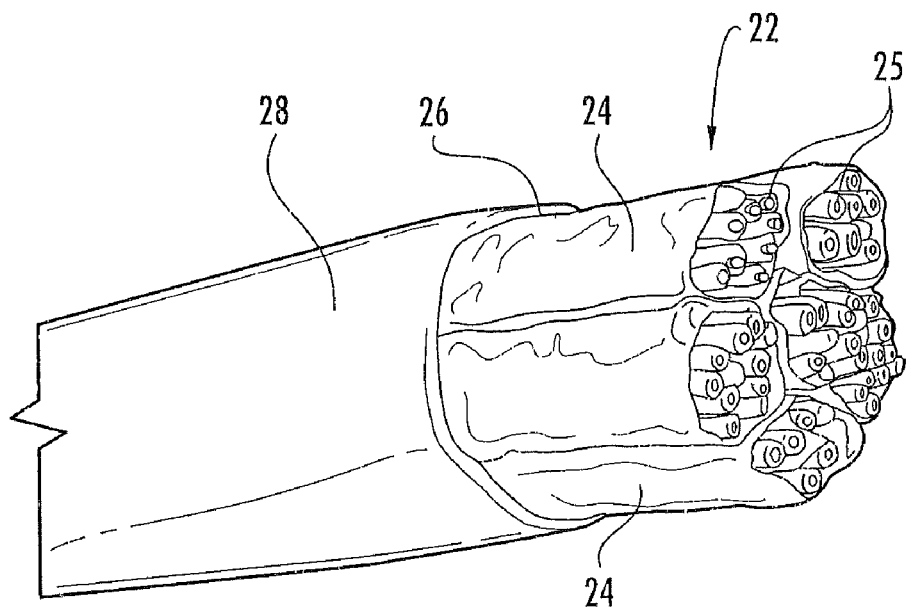
FIG. 3 is a perspective section view of the cable of the assembly of FIG. 1.

Referring now to FIG. 3, the cable 22 comprises six separate cable subunits 24, each of which includes 4 twisted pairs of conductors 25. The conductors 25 are conventional twisted pair conductors and need not be described in detail herein. Each of the subunits 24 is circumferentially enclosed in a conductive shield 26 to reduce crosstalk between cable subunits 24. The set of six subunits 24 is then circumferentially enclosed in a jacket 28, which is typically formed of a polymeric material.

Figure 4:
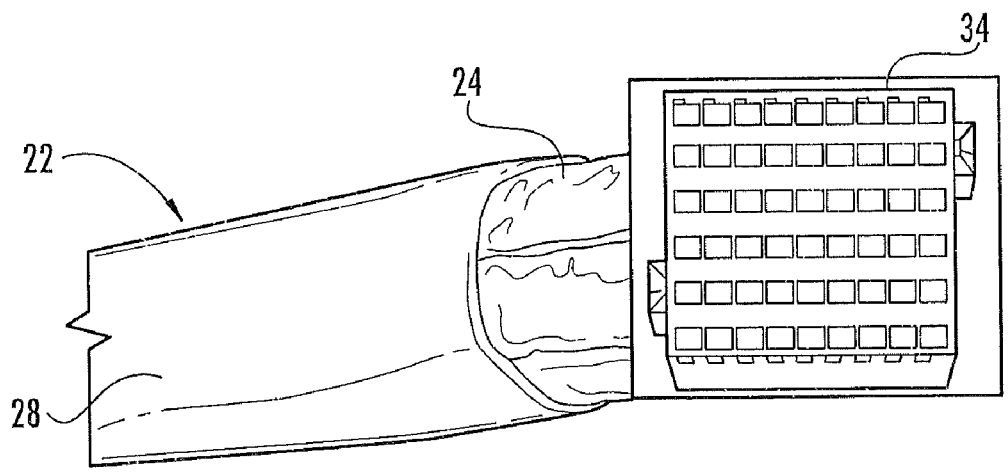
FIG. 4 is a perspective view of a connector unit of FIG. 1 mounted to the end of the cable of FIG. 3.
Figure 5:
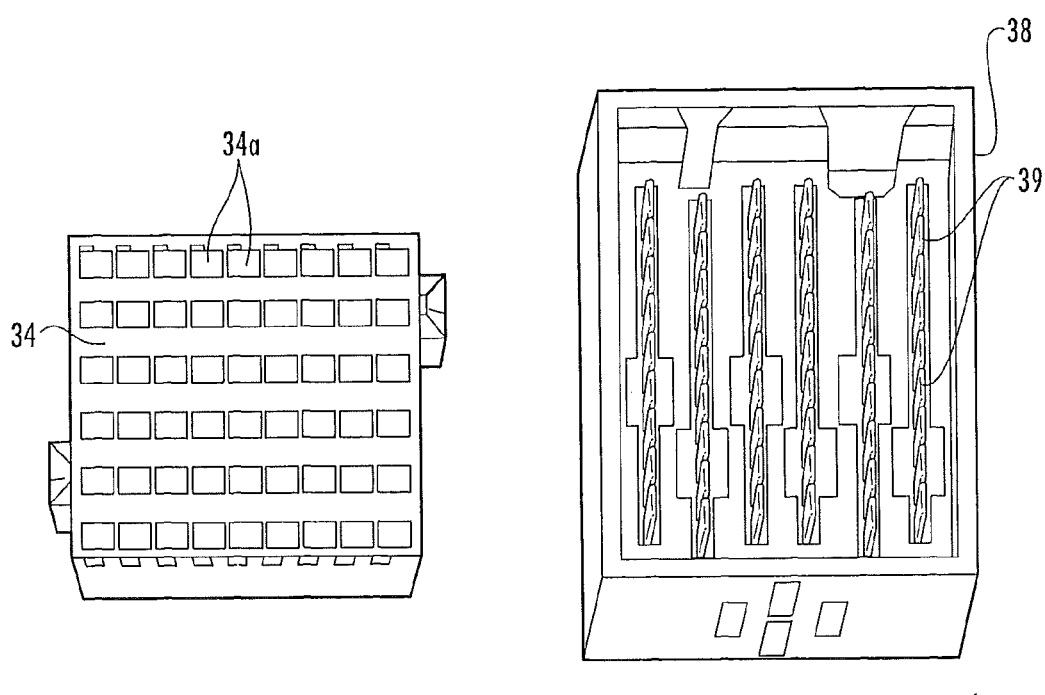
FIG. 5 is an exploded end view of a mating jack and plug of the connector unit of the assembly of FIG. 1.
Figure 6A:
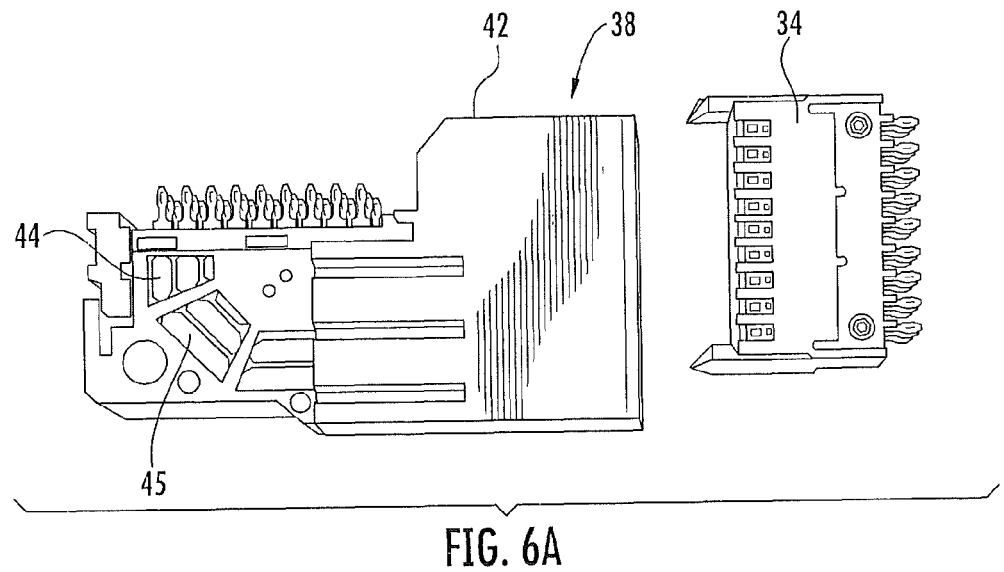
FIG. 6A is an exploded side view of the mating jack, plug and backplane array of the connector unit of FIG. 2.

The conductors 25 of the cable 22 are attached at each end to a respective 24-pair plug 34 (FIGS. 1, 4 and 5). Each plug 34 includes a plurality of apertures 34a for receiving contacts from a respective mating 24-pair jack 38 (FIGS. 1, 5 and 6A). In some embodiments (known as "breakout" cables), the plug 34 may be replaced with six RJ-45 plugs. In other embodiments, the conductors 25 may be connected directly to telecommunications equipment via a punch-down connector or the like.

Figure 6B:
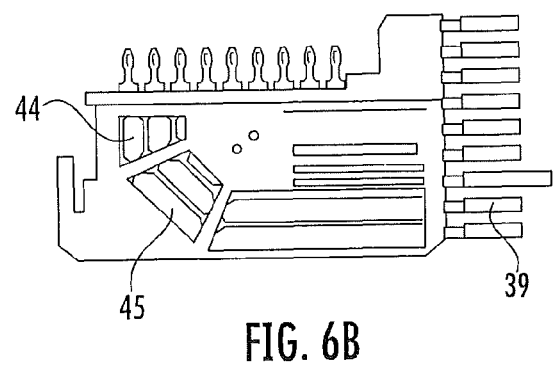
FIG. 6B is a side view of one of the cards of the jack of FIG. 6A.

Each connector unit 23 includes a backplane jack 38 as described above. As can be seen in FIGS. 5 and 6A, each backplane jack 38 includes projecting contacts 39 that extend into and mate with contacts within the apertures 34a of the plugs 34. The contacts 39 of the jacks 38 are connected in rows with respective cards 44 (see FIGS. 6A and 6B). The cards 44 are arranged in a stacked relationship and are covered with a plastic housing 42. Each of the cards 44 includes traces 45 that carry signals to and from the contacts 39.

Figure 6C:
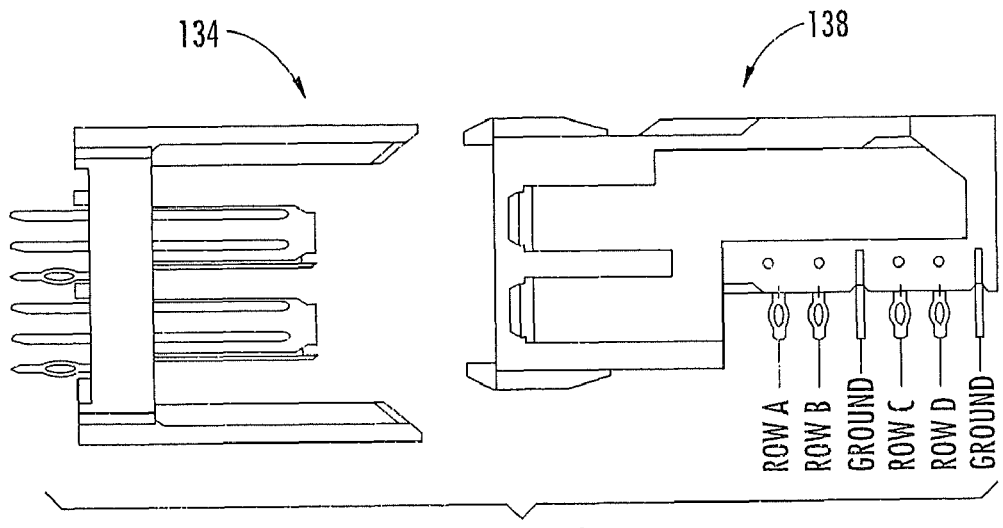
FIG. 6C is an exploded side view of another embodiment of a mating jack and plug according to embodiments of the invention.
Figure 6D:
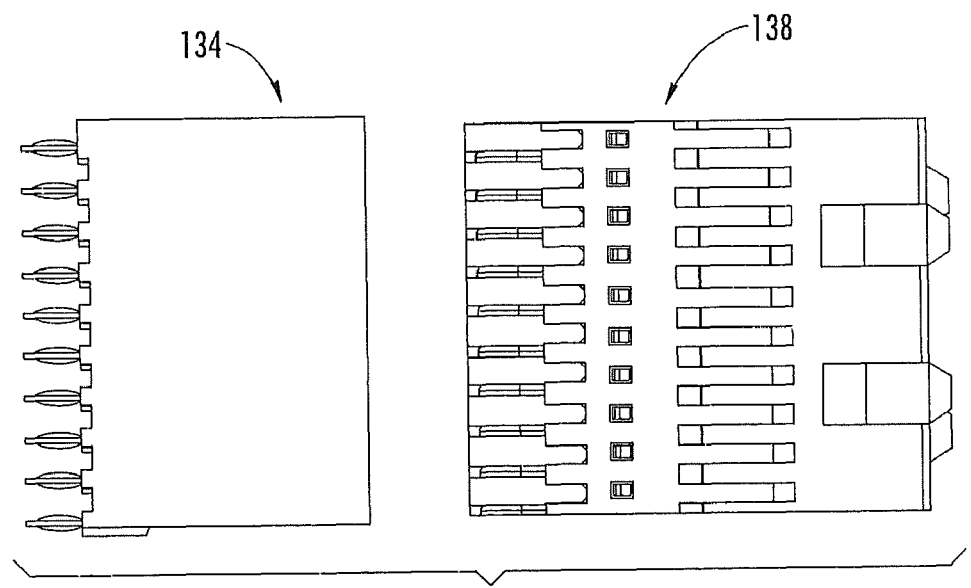
FIG. 6D is an exploded top view of the mating jack and plug of FIG. 6C.
Figure 8A:
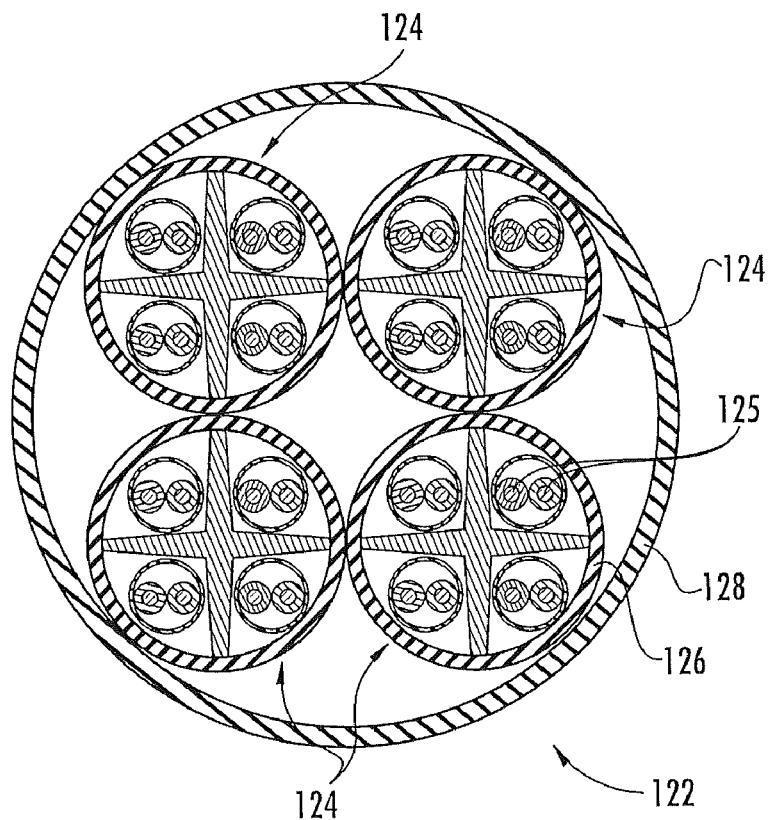
FIG. 8A is a section view of a shielded twisted pair cable of the assembly of FIG. 7.
Figure 8B:
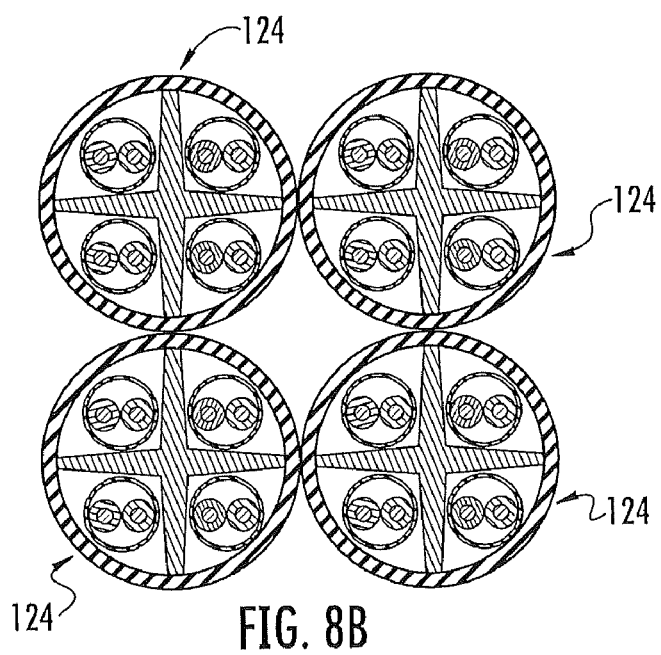
FIG. 8B is a section view of an unshielded twisted pair cable of the assembly of FIG. 7.
Figure 10:
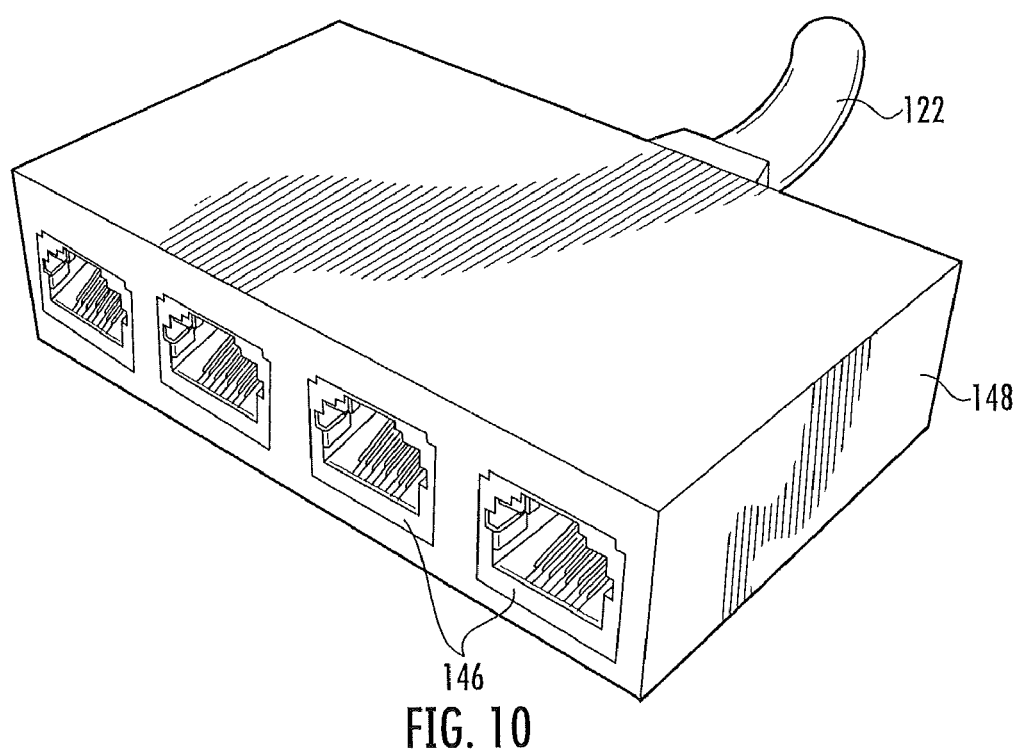
FIG. 10 is a perspective view of the housing and RJ-45 jacks of the assembly of FIG. 7.

Referring to FIGS. 6C and 6D, an alternative backplane jack 138 and plug 134 are illustrated therein. The jack 138 and plug 134 are of a 2×9 arrangement. An exemplary backplane jack is the FX-Z connector, available from Foxconn Technology Group (Tucheng City, Taipei, Taiwan).

Figure 2:
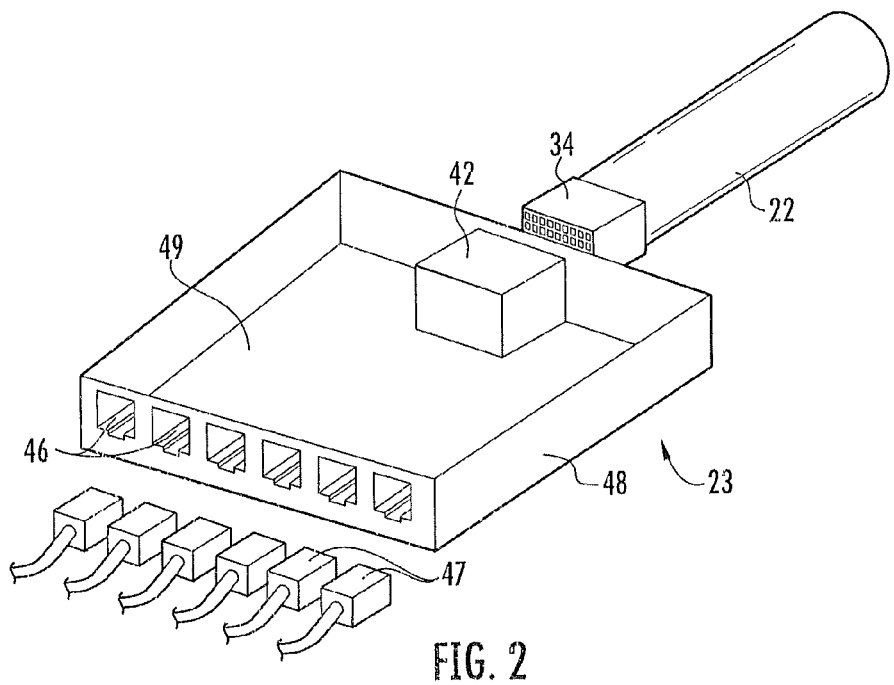
FIG. 2 is a schematic perspective view of the connector unit of the assembly of FIG. 1 with the upper portion of the housing removed for clarity.

Each backplane jack 38 is mounted within a housing 48 (FIG. 2). Six RJ-45 jacks 46 are integrated on a printed wiring board 49 and mounted in a wall of the housing 48 opposite the jack 38. The printed wiring board 49 is mounted in the housing 48 between the cards 44 and the jacks 46 with traces that carry signals therebetween. The RJ-45 jacks 46 may be Category 6A jacks which typically include integrated crosstalk compensation components/structure/circuitry that enable the jacks to achieve Category 6A performance standards (as defined by TIA-568-B.2-10). Exemplary jacks 46 are described in U.S. Pat. Nos. 7,204,722 and 7,264,516, which are incorporated herein by reference, and are available under model numbers MGS-500 and MGS-600 from CommScope, Inc. (Hickory, N.C.). The RJ-45 jacks 46 can provide interconnection locations to other telecommunications equipment via RJ-45 plugs, such as those designated at 47 in FIG. 2.

It is contemplated that, in some embodiments, an assembly 10 as described above may be able to deliver Category 6A electrical performance, particularly with respect to return loss, and internal and alien crosstalk performance. In particular, the connector units 23 can provide Category 6A performance, as can the cable 22.

Another embodiment of a cable-connector assembly, designated broadly at 110, is shown in FIGS. 7-11. The cable-connector assembly 110 includes a cable 122 that has four cable subunits 124, each of which includes four twisted pairs of conductors 125. The subunits 124 may each be circumferentially surrounded by a shield 126 as shown in FIG. 8A, or may lack a shield as in FIG. 8B. The shielded embodiment of FIG. 8A includes a surrounding jacket 128; the unshielded embodiment of FIG. 8B is arranged as a quartet with the jackets of individual subunits 124 attached via glue, looming or the like (this arrangement may be employed for foiled twisted pair subunits also). Another alternative cable arrangement is illustrated in FIGS. 9A-9C and designated broadly at 122'. The cable 122' includes four subunits 124' (each of which contains four twisted pairs of conductors 125') that are connected by webs 127' that are generally coplanar and offset from the center of each subunit 124' when the cable 122' is in an unfolded condition as in FIG. 9A. As shown in FIG. 9B, the subunits 124' can be folded into a folded condition in which they form a quartet much like the subunits of the cables of FIGS. 8A and 8B. The quartet is then covered with a jacket 128'. Those skilled in this art will appreciate that other numbers and/or arrangements of subunits may be employed in cables according to embodiments of the present invention.

The assembly 110 includes connector units 123 on each end. As seen in FIG. 7 the connector unit 123 includes the male 2-pair×9 connector 134 of FIGS. 6C and 6D (available from Foxconn Technology Group, Tucheng City, Taipei, Taiwan) that attaches to the individual conductors 125 of the cable 123. The connector 134 mates with the mating female 2-pair×9 connector 138 of FIGS. 6C and 6D (also available from Foxconn) that is attached to a housing 148. In the wall opposite the connector 138, the housing 148 includes four Category 6A RJ-45 jacks 146; these are connected with the connector 138 via a backplane similar to that shown in connection with the assembly 10 (see FIG. 10). Those skilled in this art will appreciate that the male and female connectors may be switched in some embodiments.

Figure 11:
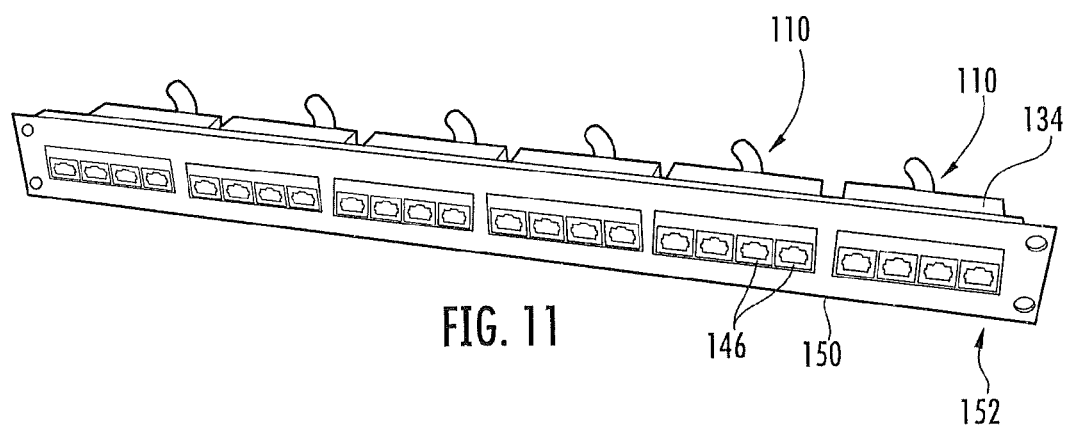
FIG. 11 is a perspective view of six assemblies of FIG. 7 mounted in a patch panel.

As can be seen in FIG. 11, multiple assemblies 110 may be attached to a bezel 150 to form a patch panel 152 having, in the illustrated embodiment, a total of 24 RJ-45 jacks 146 for interconnection with patch cords. In some embodiments, the assembly 110 may have only one housing 148, or in other embodiments the assembly 110 may terminate with the connector 134. Also, in some embodiments the assembly 110 may take the form of a breakout cable that has RJ-45 jacks on one end.

Figure 18:
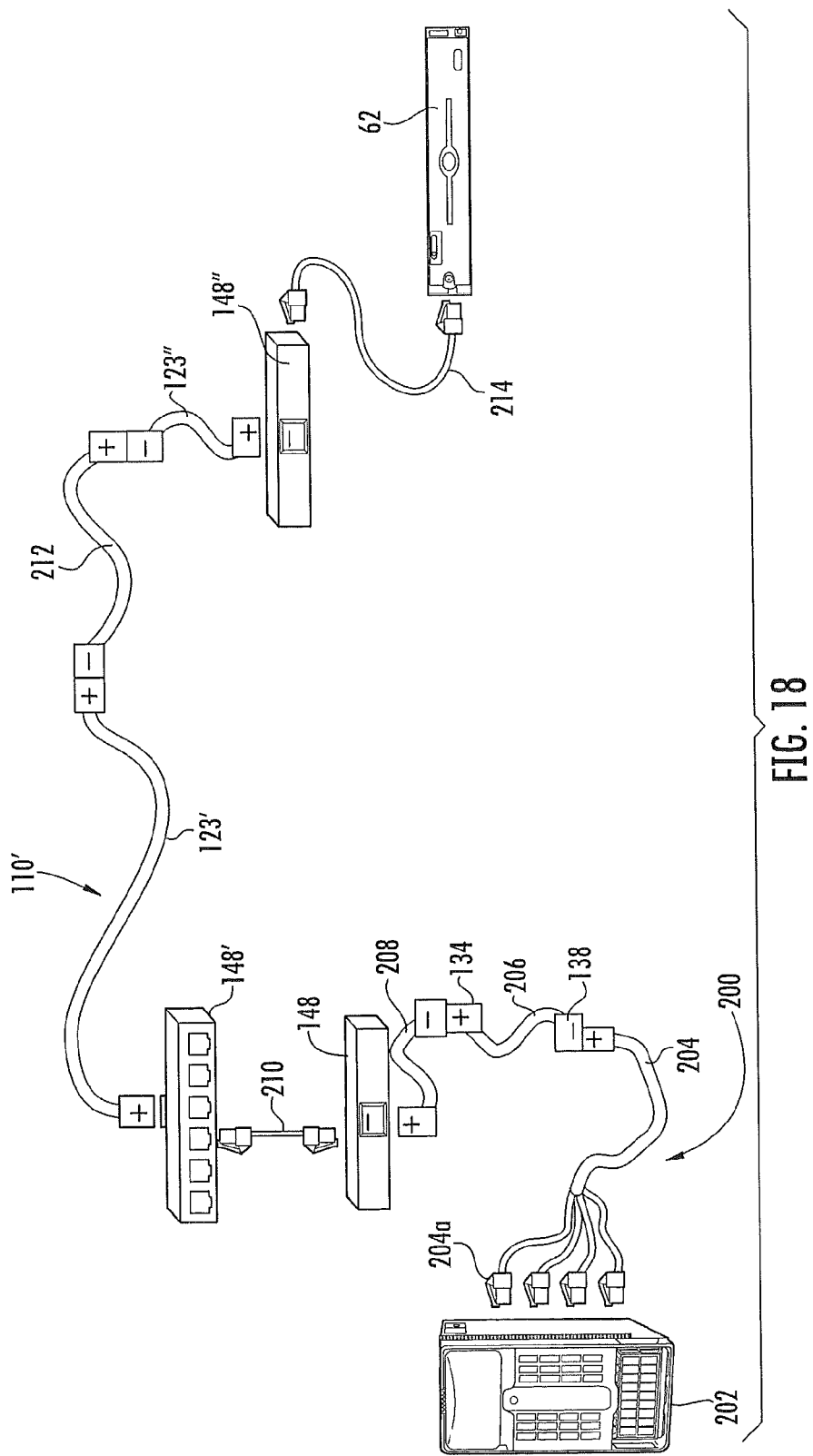
FIG. 18 is a schematic diagram illustrating a cascading cross-connection scheme utilizing multiple cable assemblies of FIG. 4 with a connector of FIG. 6 on the opposite end of the cable.

In still further embodiments, the assembly may take the form of an extension trunk cable in which one end terminates with a connector (jack) 134 and the other end terminates with a connector (plug) 138. Such cable assemblies can enable the cables of other systems and assemblies of the present invention to be effectively lengthened (such as is seen in FIG. 18).

Figure 12:
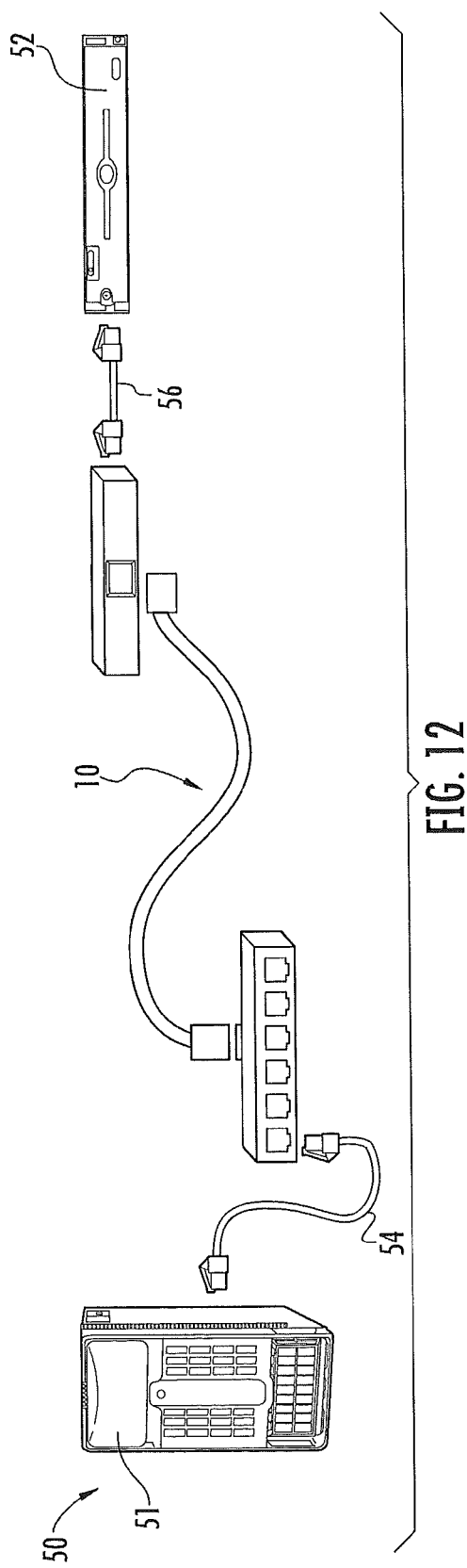
FIG. 12 is a schematic diagram illustrating an interconnection scheme for a data center that utilizes the assembly of FIG. 1.
Figure 13:
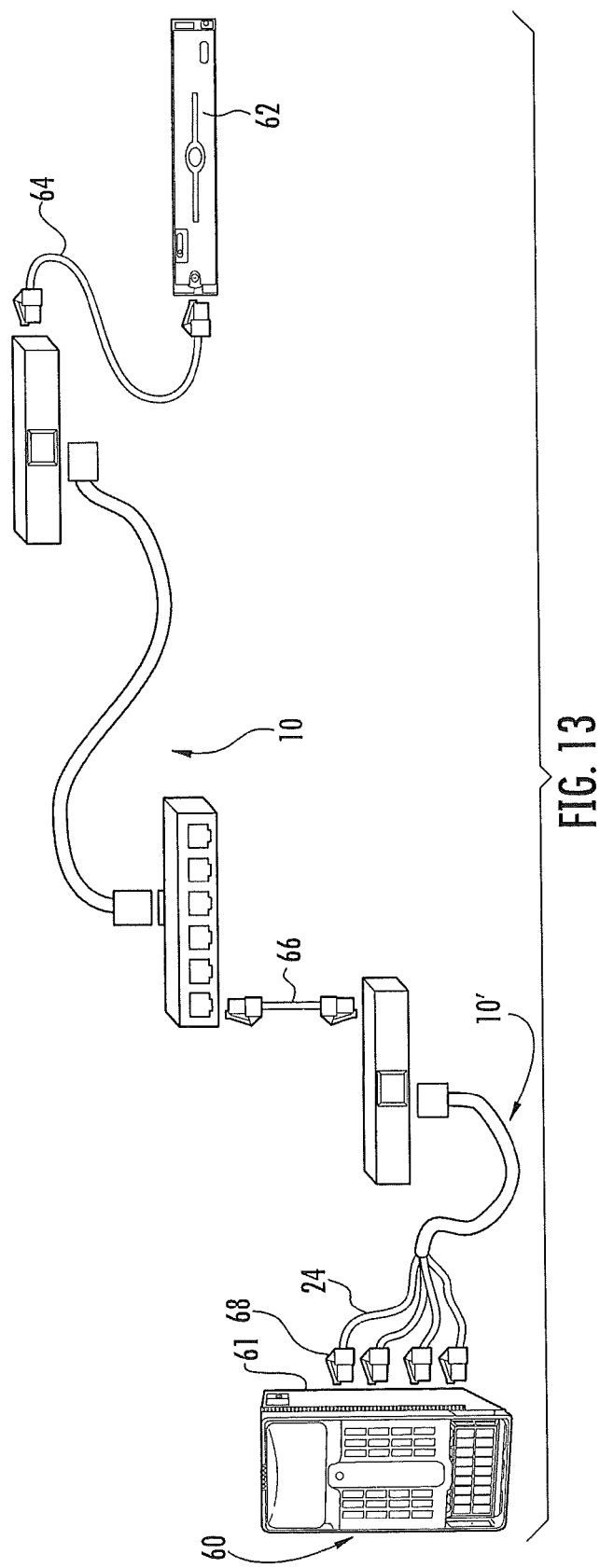
FIG. 13 is a schematic diagram illustrating a cross-connection scheme for a data center that utilizes the assembly of FIG. 1.

FIGS. 12-18 illustrate different interconnection arrangements in which the assemblies 10, 110 and similar devices may be effectively utilized. Turning first to FIG. 12, the interconnection of a data center 50 is shown. Connection of a core switch 51 with a server 52 can be achieved via an assembly 10 connected with patch cords 54, 56. A similar interconnection scheme is shown in FIG. 13, in which a core switch 61 is connected with a server 62. In this scheme, an assembly 10 is connected with the server 62 via patch cords 64 (one of which is shown in FIG. 13). The assembly 10 is then connected via patch cords 66 with another assembly 10' that lacks one connector unit 23; instead, on that end the cable 22 is broken out into its individual cable subunits 24, each of which is attached via a Category 6A RJ-45 plug 68 to the core switch 61 to form a data center 60.

Figure 14:
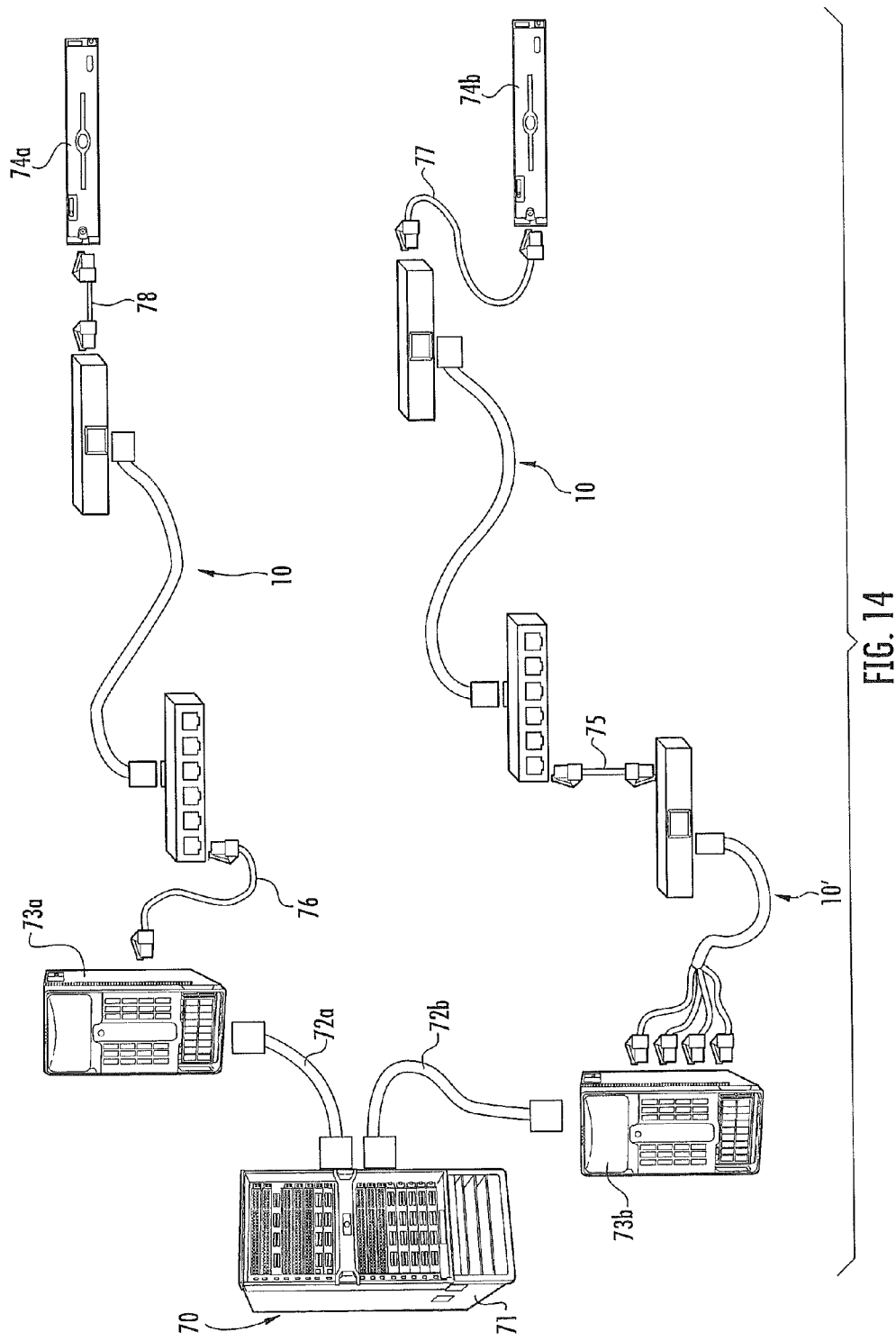
FIG. 14 is a schematic diagram illustrating an interconnection and cross-connection scheme for a core switch that utilizes the assembly of FIG. 1, wherein two different architecture arrangements are shown.

Turning now to FIG. 14, a data center 70 that serves different architecture schemes is shown. A core switch 71 is connected via trunk cables 72a, 72b to aggregation switches 73a, 73b. The trunk cables 72a, 72b may be configured as the cable 22 above with a 24-pair plug 34 on each end. The aggregation switch 73a is connected to a server 74a with an assembly 10 via standard RJ-45 patch cords 76, 78. This arrangement is suitable for Middle of Rack (MoR) and End of Rack (EoR) architectures. The aggregation switch 73b is connected to a server 74b via an assembly 10' that is connected with an assembly 10 via patch cords 75; the assembly 10 is then connected to the server 74b via patch cords 77. This arrangement is suitable for modular, scalable data center topologies and architectures and is also known as a cross-connection scheme.

Figure 15:
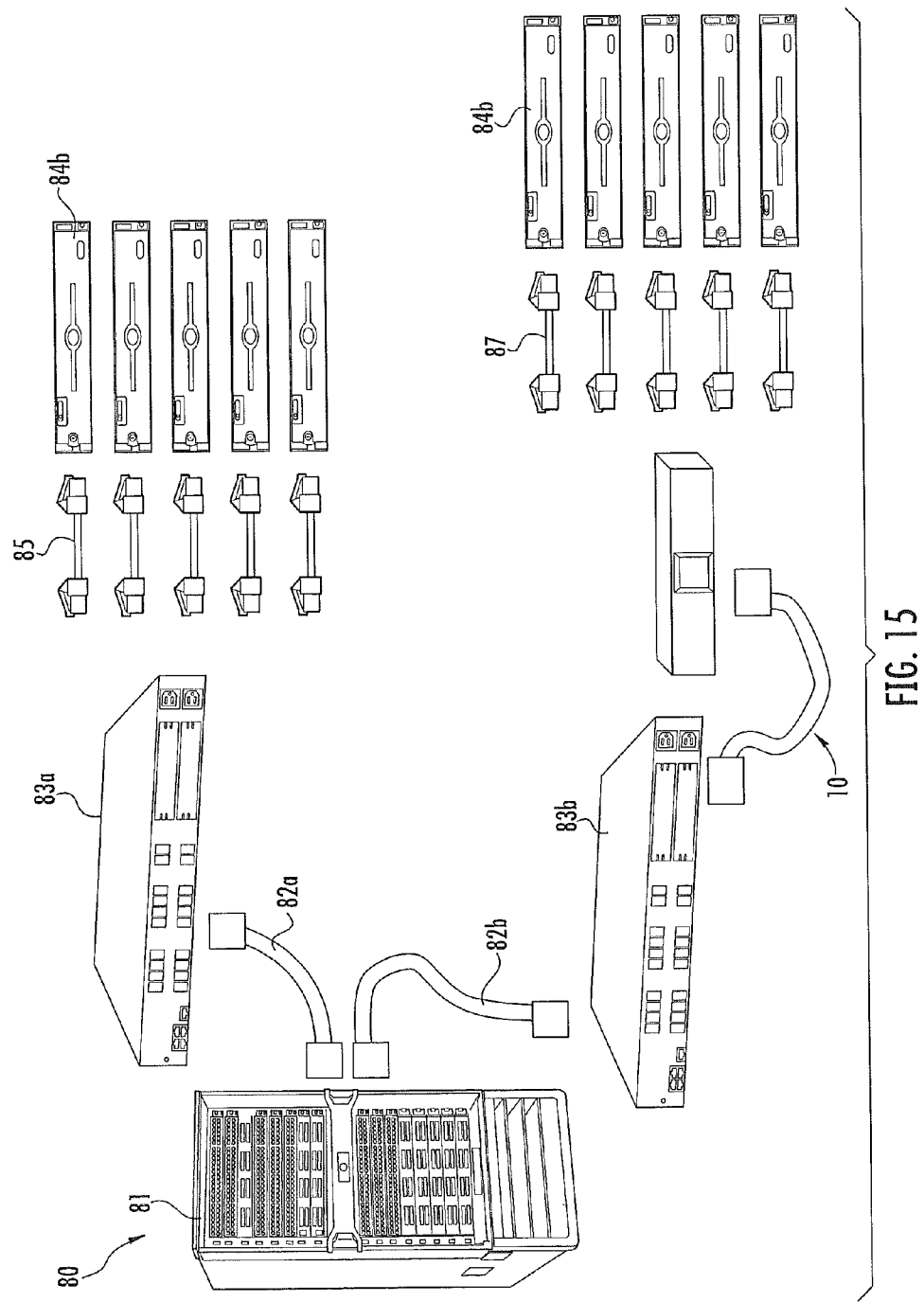
FIG. 15 is a schematic diagram illustrating another interconnection scheme for a core switch that utilizes the assembly of FIG. 1.

Turning now to FIG. 15, a data center 80 exhibits two different Top of Rack (ToR) architecture schemes. A core switch 81 is connected via trunk cables 82a, 82b (of the configuration described above for cables 72a, 72b) to two ToR switches 83a, 83b. The ToR switch 83a is connected to a plurality of servers 84a via patch cords 85. The ToR switch 83b is connected to a plurality of servers 84b via an assembly 10 (which may connect to the switch 83b via a plug 34, RJ-45 plugs, or punch-down contacts) and patch cords 87.

Figure 16:
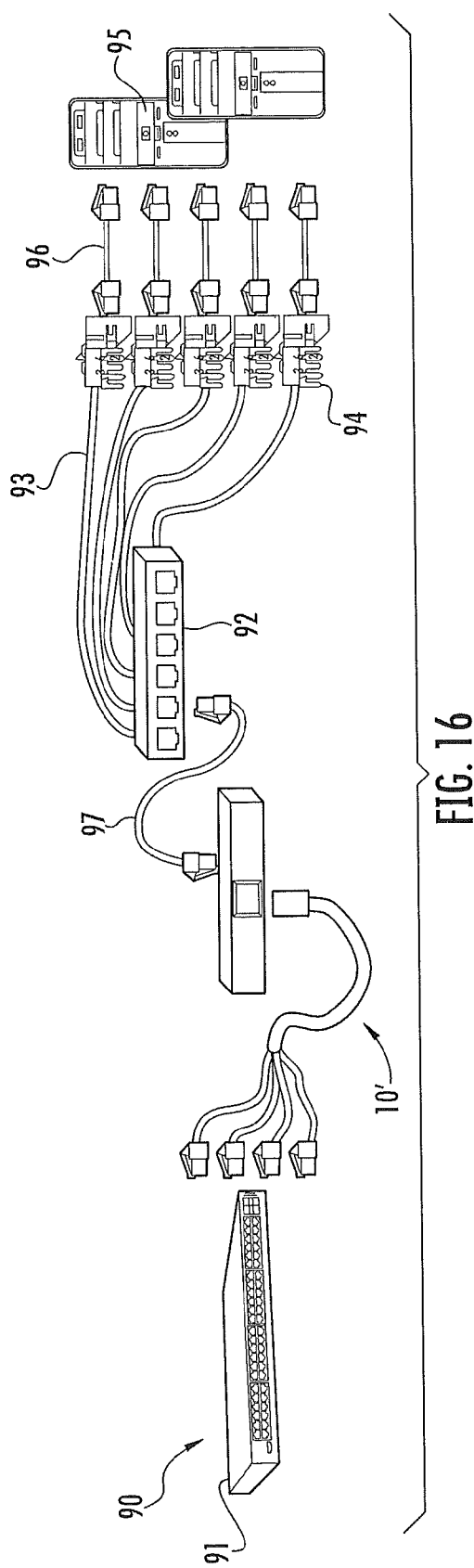
FIG. 16 is a schematic diagram illustrating a cross-connection scheme for an access switch that utilizes the assembly of FIG. 1.
Figure 17:
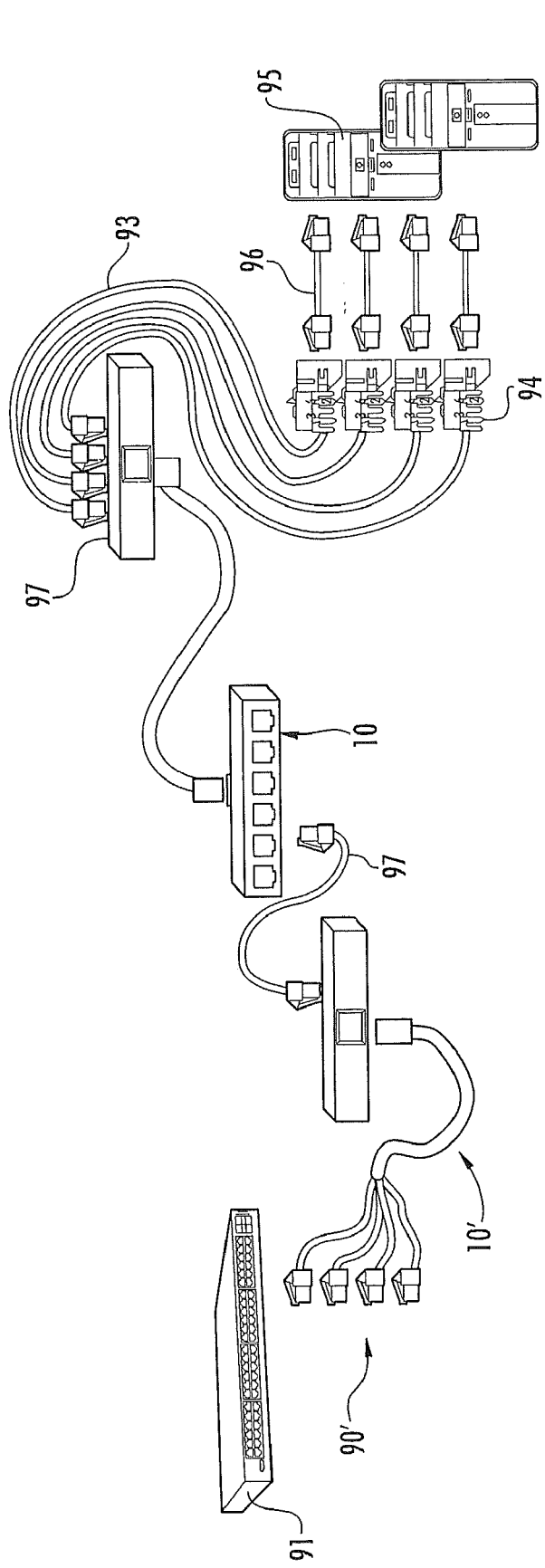
FIG. 17 is a schematic diagram illustrating an interconnection and cross-connection scheme for an access switch that utilizes the assembly of FIG. 1.

Referring now to FIG. 16, a horizontal cross-connect system 90 is shown therein. An access switch 91 is connected to an assembly 10', which in turn is connected to a patch panel 92 with patch cords 97. The patch panel 92 is then connected via patch cords 93 to jacks 94, which are then connected to workstations 95 with patch cords 96. FIG. 17 shows a similar arrangement 90', but includes an assembly 10 between the assembly 10' and a consolidation point 97. The consolidation point 97 is then connected to the jacks 94 with patch cords 93.

FIG. 18 illustrates an assembly 200 in which multiple assemblies 110, 110' can be interconnected in a concatenated fashion via intervening extension trunk cables of the construction of the cables 23, 123. A core switch 202 is connected to a breakout cable 204 of the same construction as the cables 123 with the exception that on one end the terminating connector is replaced with RJ-45 plugs 204a attached to each of the cable subunits. The breakout cable 204 is connected to two extension trunk cables 206, 208. The construction of the extension trunk cables 206, 208 are identical: they have a plug 134 and a jack 138 on opposite ends of the cable 122. The extension trunk cable 208 is connected to a housing 148 at the opposite end through a jack 138. Thus, the length of an assembly 110 is effectively increased through the use of the extension trunk cables 206, 208. The RJ-45 jacks of the housing 148 are connected to the RJ-45 jacks of another assembly 110' via patch cords 210. The assembly 110' has two extension trunk cables 212, 123". The extension trunk cable 123" connects with housing 148" through a jack 138. The use of extension trunk cables 212, 123" effectively lengthens the assembly 110'. The RJ-45 jacks of the housing 148" are then connected to the RJ-45 jacks of a server 62 via patch cords 214.

In some embodiments, the trunk cables 123' are supplied in different lengths (such as multiples of 10 meters), and the breakout and extension trunk cables 204, 206, 212, 123" are supplied in prime number meter lengths, such that virtually any typical desired length of cable can be created by inserting a combination of extension trunk cables at the end of the main trunk cable 123' or the breakout cable 204. As such, two pieces of equipment can be easily and rapidly interconnected with a cable assembly of a desired length. Of course, the cables may be supplied in non-prime number lengths as well in other embodiments.

Those skilled in this art will recognize that, through the use of assemblies of the types described above, technicians can interconnect equipment in a "plug-and-play" fashion, and can do so with cables that have on either end (a) a housing with RJ-45 jacks mounted therein, (b) RJ-45 jacks "broken out" from the cable, or (c) a suitable connector (jack or plug) that can mate with a mating connector of another multi-subunit cable, which can provide the technician with the flexibility to interconnect equipment in almost any desired manner. Also, the "plug-and-play" arrangement should ensure the technician that the desired level of performance (e.g., Category 6A) is achievable with these components.

In some embodiments, it may be desirable to include "intelligent infrastructure system" features to the assemblies 10, 110 to enable the tracking of connections between different pieces of equipment. An intelligent infrastructure system can be implemented in a number of ways, including out-of-band communication, a dedicated control channel, RFID, Serial ID, mechanical sensors or other unique identification in the terminations and ports, and other known methods of tracking patching connections. In additional embodiments, intelligent tracking may be performed for each subunit of the above-described cables.

Moreover, the trunk and extension cables of the present invention may be employed in a system in which the cables and their jacks/plugs themselves plug directly into panels and equipment (e.g., core switches, servers and the like), rather than requiring RJ-45 connectors for interconnection. Such an arrangement can produce a system with much higher performance. For example, if the prior-described systems were "10G" systems when using a 16-pair cable, use of such panels and equipment may produce a "40G" system with a 16-pair cable.

The foregoing embodiments are illustrative of the present invention, and are not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A datacommunication connector unit, comprising:
   a housing;
   a printed wiring board mounted within the housing;
   a plurality of RJ-45 jacks mounted on the printed wiring board and accessible from one side of the housing; and
   a backplane connector mounted to the printed wiring board and electrically connected to the RJ-45 jacks, the backplane connector being accessible from a second side of the housing;
   in combination with a cable-connector assembly, comprising:
   a trunk cable comprising a plurality of subunits, each of the subunits comprising a plurality of twisted pairs of conductors; and
   a connector attached to each end of the cable, each of the connectors including a contact for each of the conductors of the cable, the connector of the cable-connector assembly being connected with the backplane connector of the connector unit.

2. The connector unit defined in claim 1, wherein the housing includes first and second opposed side walls, and wherein the RJ-45 jacks are mounted to be accessible through the first side wall, and the backplane connector is mounted to be accessible through the second side wall.

3. The connector unit defined in claim 1, wherein the plurality of RJ-45 jacks is performance-rated as at least Category 6A jacks.

4. The connector unit defined in claim 1, wherein the backplane connector is a plug.

5. The connector unit defined in claim 1, wherein the backplane connector is a jack.

6. A datacommunication connector unit, comprising:
   a housing;
   a printed wiring board mounted within the housing;
   a plurality of RJ-45 jacks mounted on the printed wiring board and accessible from one side of the housing; and
   a backplane connector mounted to the printed wiring board and electrically connected to the RJ-45 jacks, the backplane connector being accessible from a second side of the housing;
   wherein the backplane connector comprises a plurality of cards in stacked relationship, each card including an electrical trace.

7. The connector unit defined in claim 6, wherein the housing includes first and second opposed side walls, and wherein the RJ-45 jacks are mounted to be accessible through the first side wall, and the backplane connector is mounted to be accessible through the second side wall.

8. The connector unit defined in claim 6, wherein the plurality of RJ-45 jacks is performance-rated as at least Category 6A jacks.

9. The connector unit defined in claim 6, wherein the backplane connector is a plug.

10. The connector unit defined in claim 6, wherein the backplane connector is a jack.

11. The connector unit defined in claim 6, in combination with a cable including a plurality of subunits, each of the subunits comprising a plurality of twisted pairs of conductors.

12. The combination defined in claim 11, wherein the cable includes a jack attached to one end of the cable, the jack including a contact for each of the conductors of the cable.

13. The combination defined in claim 11, wherein the cable includes a plug attached to one end of the cable, the plug including a contact for each of the conductors of the cable.

* * * * *